United States Patent
Pan et al.

(10) Patent No.: US 9,563,014 B2
(45) Date of Patent: Feb. 7, 2017

(54) EDGE COUPLING USING ADIABATICALLY TAPERED WAVEGUIDES

(71) Applicant: Futurewei Technologies, Inc., Plano, TX (US)

(72) Inventors: Huapu Pan, San Jose, CA (US); Hongmin Chen, Davis, CA (US); Xueyan Zheng, Andover, MA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/680,175

(22) Filed: Apr. 7, 2015

(65) Prior Publication Data

US 2015/0285997 A1    Oct. 8, 2015

Related U.S. Application Data

(60) Provisional application No. 61/976,803, filed on Apr. 8, 2014.

(51) Int. Cl.
*G02B 6/122* (2006.01)
*G02B 6/30* (2006.01)

(52) U.S. Cl.
CPC .......... *G02B 6/1228* (2013.01); *G02B 6/1223* (2013.01); *G02B 6/305* (2013.01)

(58) Field of Classification Search
CPC .............................. G02B 6/305; G02B 6/1228
See application file for complete search history.

(56) References Cited

U.S. PATENT DOCUMENTS

| 6,987,913 B2* | 1/2006 | Blauvelt ............ G02B 6/12002 385/28 |
| 8,442,368 B1 | 5/2013 | Reano et al. |
| 2005/0185893 A1* | 8/2005 | Liu ........................ G02B 6/305 385/50 |
| 2009/0003770 A1* | 1/2009 | Gill .................... G02B 6/12002 385/49 |

(Continued)

FOREIGN PATENT DOCUMENTS

JP    S5655086 A    5/1981

OTHER PUBLICATIONS

Fang, et al., "Suspended Optical Fiber-to-Waveguide Mode Size Converter for Silicon Photonics," Optics Express, vol. 18, No. 8, Apr. 12, 2010, 7 pages.

(Continued)

*Primary Examiner* — Omar R Rojas
(74) *Attorney, Agent, or Firm* — Conley Rose, P.C.

(57) ABSTRACT

An apparatus comprising a thick waveguide comprising a first adiabatic tapering from a first location to a second location, wherein the first adiabatic tapering is wider at the first location than at the second location, and a thin slab waveguide comprising a second adiabatic tapering from the first location to the second location, wherein the second adiabatic tapering is wider at the second location than at the first location, and a third adiabatic tapering from the second location to a third location, wherein the third adiabatic tapering is wider at the second location than at the third location, wherein at least a portion of the first adiabatic tapering is adjacent to the second adiabatic tapering, and wherein the first adiabatic tapering and the second adiabatic tapering are separated from each other by a constant gap.

26 Claims, 10 Drawing Sheets (56) References Cited

U.S. PATENT DOCUMENTS

| | | | | |
|---|---|---|---|---|
| 2009/0297093 A1* | 12/2009 | Webster | ............... | G02B 6/1228 |
| | | | | 385/14 |
| 2010/0247037 A1 | 9/2010 | Little | | |
| 2012/0224820 A1* | 9/2012 | Onishi | ................... | G02B 6/305 |
| | | | | 385/131 |
| 2013/0285184 A1* | 10/2013 | Li | .......................... | H01L 31/18 |
| | | | | 257/432 |
| 2015/0104130 A1* | 4/2015 | Anderson | ............ | G02B 6/1228 |
| | | | | 385/28 |

OTHER PUBLICATIONS

Gould, et al., "Ultra-Thin Silicon-on-Insulator Strip Waveguides and Mode Couplers," Applied Physics Letters 101, 221106, 2012, 4 pages.
Foreign Communication From a Counterpart Application, PCT Application No. PCT/US2015/024614, International Search Report dated Jun. 30, 2015, 5 pages.
Foreign Communication From a Counterpart Application, PCT Application No. PCT/US2015/024614, Written Opinion dated Jun. 30, 2015, 6 pages.

* cited by examiner

EDGE COUPLING USING ADIABATICALLY TAPERED WAVEGUIDES

CROSS-REFERENCE TO RELATED APPLICATIONS

The present application claims priority to U.S. Provisional Application No. 61/976,803 filed Apr. 8, 2014 by Huapu Pan, et al., and entitled "Edge Coupling Device Using Adiabatically Tapered Waveguides," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In optical transceivers, it is desirable to integrate as many photonic components in one chip as possible. As integration density increases and the sizes of photonic components shrink, however, it is increasingly difficult to integrate a photonic integrated circuit (PIC) with other optical components such as fibers because the mode size in the waveguide of the PIC shrinks correspondingly. For example, the mode size of a typical 450 nanometer (nm)×220 nm waveguide in a silicon-based PIC is roughly the size of the waveguide itself, but the mode size of a standard single-mode fiber is as large as 9.2 micrometers ($\mu$m). It may be necessary to transfer the optical modes from a high-index-contrast well-confined waveguide (e.g., a PIC) to a low-index-contrast large waveguide (e.g., an optical fiber). However, such transfer may cause undesirable optical losses, which should be minimized.

Existing methods fabricate an edge coupling device by tapering down a width of a high-index-contrast waveguide in order to transfer a mode from the high-index-contrast waveguide to a large, low-index-contrast waveguide. However, optical loss due to the transition may depend on a minimum width of the high-index-contrast waveguide, and a small minimum width of the taper (e.g., less than 80 nm) must be fabricated in order to achieve acceptable optical loss. Other methods fabricate an edge coupling device by transferring the optical mode from a thick, high-index-contrast waveguide to a thin slab, high-index-contrast waveguide made of silicon. The thin slab itself is used as the edge coupler. However, the mode size using the thin slab, high-index-contrast waveguide is still limited. Other existing methods are also insufficient for transferring optical modes from a high-index waveguide to a low-index waveguide. For example, a simple inverse taper may have a limited mode size and a trident edge coupling device may not achieve a low coupling loss.

SUMMARY

In one embodiment, the disclosure includes an apparatus comprising a thick waveguide comprising a first adiabatic tapering from a first location to a second location, wherein the first adiabatic tapering is wider at the first location than at the second location, and a thin slab waveguide comprising a second adiabatic tapering from the first location to the second location, wherein the second adiabatic tapering is wider at the second location than at the first location, and a third adiabatic tapering from the second location to a third location, wherein the third adiabatic tapering is wider at the second location than at the third location, wherein at least a portion of the first adiabatic tapering is adjacent to the second adiabatic tapering, and wherein the first adiabatic tapering and the second adiabatic tapering are separated from each other by a constant gap.

In another embodiment, the disclosure includes an optical mode converting method comprising receiving a light on a first waveguide, transferring an optical mode of the light from a first adiabatic tapering on the first waveguide to a second adiabatic tapering on a second waveguide using first mode coupling, transferring the optical mode from a third adiabatic tapering on the second waveguide to a third waveguide using a second mode coupling.

In yet another embodiment, the disclosure includes an apparatus comprising a first waveguide comprising a first adiabatic tapering and configured to receive a light and to mode couple to a second adiabatic tapering on a second waveguide, and the second waveguide comprising the second adiabatic tapering and a third adiabatic tapering and configured to mode couple to a third waveguide, wherein at least a portion of the first adiabatic tapering is adjacent to the second adiabatic tapering, and wherein the first adiabatic tapering and the second adiabatic tapering are separated from each other by a constant gap.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments for improved edge coupling. The embodiments use multiple inverse tapers in both the horizontal and vertical direction to adjust the mode size of an edge coupling device. Specifically, an edge coupling device transfers the transverse-electric (TE) optical mode first from a thick waveguide to a thin slab waveguide, then from the thin slab waveguide to a large-size, low-index waveguide by tapering down a width of the thin slab waveguide. The disclosed embodiments provide for an adiabatic transition from a thick waveguide to a thin slab waveguide, which provides for a low loss; a minimum feature in the edge coupling device that is larger than using a multiple-stage taper to achieve a similar loss, which may provide improved fabrication tolerance; and monolithic integration with other passive and active silicon photonic components. Adiabatic tapering provides a slow tapering transition to allow smooth optical mode transferring.

Figure 1:
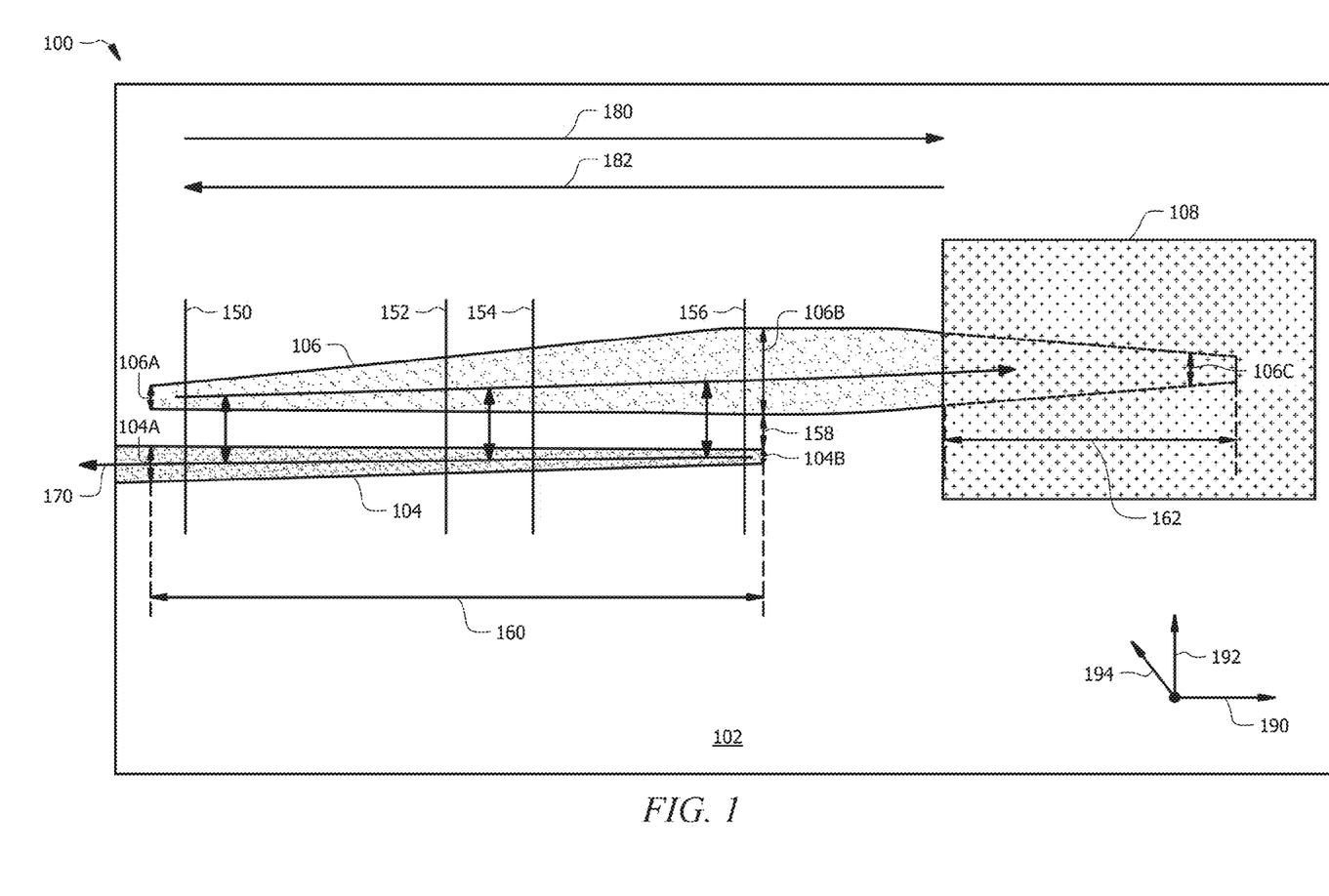
FIG. 1 is a top view of an embodiment of an edge coupling device.

FIG. 1 is a top view of an embodiment of an edge coupling device 100. Edge coupling device 100 is configured to communicate light 170 and to transfer an optical mode of the light 170 among a thick waveguide 104, a thin slab waveguide 106, and a low-index waveguide 108. Edge coupling device 100 is configured such that an optical mode of light 170 is transferred in a first direction 180 from thick waveguide 104 to thin slab waveguide 106 and from thin slab waveguide 106 to low-index waveguide 108. For example, edge coupling device 100 is configured such that thick waveguide 104 receives light 170, thick waveguide 104 transfers an optical mode of light 170 to thin slab waveguide 106 via a first mode coupling, and thin slab 106 transfers the optical mode to low-index waveguide 108 via a second mode coupling. Transferring an optical mode in the first direction 180 converts the optical mode to a larger optical mode. Converting an optical mode to a larger optical mode may be used in applications such as converting an optical mode from a waveguide to a fiber. Alternatively, the optical mode of light 170 can be transferred in a second direction 182 from low-index waveguide 108 to thin slab waveguide 106 and from thin slab waveguide 106 to thick waveguide 104. Transferring an optical mode in the second direction 182 converts the optical mode to a smaller optical mode. Converting an optical mode to a smaller optical mode may be used in applications such as converting an optical mode from a fiber to a chip.

Thick waveguide 104, thin slab waveguide 106, and low-index waveguide 108 are disposed on a substrate 102. Substrate 102 may be formed of materials including, but not limited to, silicon-on-insulator (SOI), indium phosphide, and oxides. The substrate 102 thickness may typically be 220 nm, but may range from 120 nm to 1 µm. Thickness is represented with respect to axis 194 into and out of the page. Edge coupling device 100 is configured such that at least a portion of an adiabatic tapering of thick waveguide 104 and at least a portion of an adiabatic tapering portion of thin slab waveguide 106 are adjacent to each other and are substantially parallel. Gap 158 between thick waveguide 104 and thin slab waveguide 106 is substantially constant. The width of gap 158 may vary from about 50 nm to about 1 µm depending on the material used for thick waveguide 104 and thin slab waveguide 106. The use of the term "about" means ±10% of the subsequent number, unless other wise stated. For example, the width of gap 158 may be from about 100 nm to about 400 nm when thick waveguide 104 and thin slab waveguide 106 are silicon, from about 100 nm to about 400 nm when thick waveguide 104 and thin slab waveguide 106 are indium phosphide, and from about 100 um to about 1 µm when thick waveguide 104 and thin slab waveguide 106 are silicon nitride. A first axis is parallel to the gap 158. Edge coupling device 100 may be configured as shown or in any other suitable configuration as would be appreciated by one of ordinary skill in the art upon viewing this disclosure.

Thick waveguide 104 has a thickness (i.e., height) that is greater than the thickness of thin slab waveguide 106. In an embodiment, the thickness of thick waveguide 104 may be about equal to the thickness of substrate 102. Thick waveguide 104 is a high-index waveguide which has a greater refractive index than a low-index waveguide (e.g., low-index waveguide 108). Examples of materials used for thick waveguide 104 include, but are not limited to, silicon, silicon nitride, and indium phosphide. Thick waveguide 104 is adiabatically tapered from a first location 104A to a second location 104B such that the first location 104A is wider than the second location 104B. Width is represented with respect to axis 192 and length is represented with respect to axis 190. First location 104A may be any suitable width and may vary depending on the material of thick waveguide 104. For example, the width of first location 104A may be from about 400 nm to about 500 nm when thick waveguide 104 is silicon, the width of first location 104A may be from about 400 nm to about 500 nm when thick waveguide 104 is indium phosphide, and the width of first location 104A may be from about 400 nm to about 1 µm when thick waveguide 104 is silicon nitride. Second location 104B has a smaller width than first location 104A. In an embodiment, second location 104B is as narrow as fabrication processes allow. For example, second location 104B may be about 130 nm or about 180 nm. Alternatively, second location 104B may be any suitable width. Thick waveguide 104 may be configured as shown or with any other suitable orientation, tapering, length, width, and/or thickness.

Thin slab waveguide 106 is a high-index waveguide. Examples of materials used for thin slab waveguide 106 include, but are not limited to, silicon, silicon nitride, and indium phosphide. In an embodiment, thin slab waveguide 106 is formed of the same material as thick waveguide 104. Thin slab waveguide 106 is about 10% to about 90% thinner than thick waveguide 104. The thickness of the thin slab waveguide 106 is small enough that the optical transition loss from the thin slab waveguide 106 to the low-index waveguide 108 is sufficiently low within the process tolerance allowed. The thickness may vary from 5% to 80% of the substrate 102 thickness. Thin slab waveguide 106 is configured such that at least a portion 160 of thin slab waveguide 106 is in parallel with thick waveguide 104. The length of the portion 160 of thin slab waveguide 106 that is parallel with thick waveguide 104 may be from about 10 µm to about 200 µm. Thin slab waveguide 106 has a first adiabatic tapering from a first location 106A to a second location 106B such that second location 106B is wider than first location 106A and has a second adiabatic tapering from second location 106B to a third location 106C such that second location 106B is wider than third location 106C. In an embodiment, first location 106A and/or third location 106C are as narrow as fabrication processes allow. For example, first location 106A and/or third location 106C are about 130 nm to about 180 nm. In another embodiment, first location 106A and/or third location 106C are any suitable width. Second location 106B may be any suitable width and may vary depending on the material of the thin slab waveguide 106. For example, the width of second location 106B may be from about 400 nm to about 500 nm when thin slab waveguide 106 is silicon, the width of second location 106B may be from about 400 nm to about 500 nm when thin slab waveguide 106 is indium phosphide, and the width of second location 106B may be from about 400 nm to about 1 μm when thin slab waveguide 106 is silicon nitride. Thin slab waveguide 106 may be configured as shown or with any other suitable orientation, tapering, length, width, and/or thickness.

The amount of optical mode from light 170 that transfers between thick waveguide 104 and thin slab waveguide 106 is proportional to the ratio of the cross-sectional area of thick waveguide 104 and the cross-sectional area of thin slab waveguide 106 at a given location, for example, at cross-sections 150-156. A larger portion of the optical mode is present in the waveguide with the larger cross-section area. For example, about 90% of the optical mode of the light 170 may be present in thick waveguide 104 when the cross-sectional area of thick waveguide 104 is about 90% larger than the cross-sectional area of thin slab waveguide 106. About 50% of the optical mode of light 170 may be present in thick waveguide 104 when the cross-sectional area of thick waveguide 104 is comparable (e.g., about equal) to the cross-sectional area of thin slab waveguide 106. About 10% of the optical mode of the light 170 may be present in thick waveguide 104 when the cross-sectional area of thick waveguide 104 is about 10% of the cross-sectional area of thin slab waveguide 106. An optical mode may transfer from a first waveguide to a second waveguide when the cross-sectional area of the first waveguide and the cross-sectional area of the second waveguide are comparable or about the same.

Low-index waveguide 108 may be a suspended oxide waveguide fabricated by removing a silicon substrate beneath a buried oxide (BOX) of the substrate 102. Examples of materials used to form the low-index waveguide 108 include, but are not limited to, silicon oxynitride (SiON), silicon-rich oxide (SiO$_x$), aluminum nitride (AlN), aluminum oxide (Al$_2$O$_3$), silicon carbide (SiC), or other suitable polymers. Low-index waveguide 108 may have a width and/or thickness between about 1 μm to about 15 μm. Low-index waveguide 108 is a low-index waveguide and has a lower refractive index than thick waveguide 104 and thin slab waveguide 106. Low-index waveguide 108 may have a refractive index in the range of about 1.4 to about 3.0. In an embodiment, at least a portion 162 of thin slab waveguide 106 is disposed within low-index waveguide 108. For example, the second adiabatic tapering of thin slab waveguide 106 is adjacent to low-index waveguide 108. Low-index waveguide 108 may partially or completely cover thin slab waveguide 106. The amount of optical mode from light 170 that transfers between thin slab waveguide 106 and low-index waveguide 108 is proportional to the ratio of the cross-sectional area of thin slab waveguide 106 and the cross-sectional area of low-index waveguide 108 at a given location, for example, at third location 106C of thin slab waveguide 106.

Figure 2:
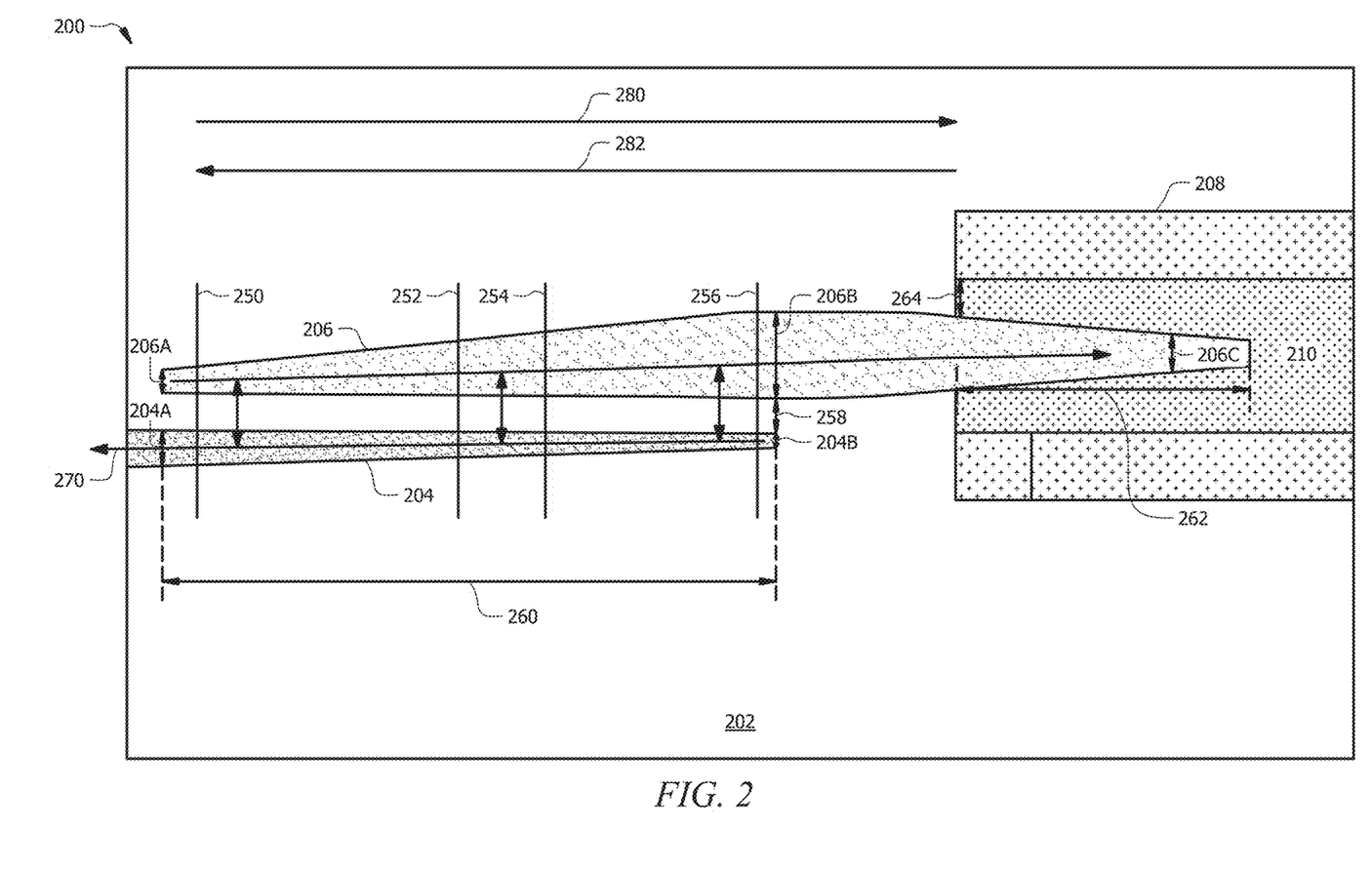
FIG. 2 is a top view of another embodiment of an edge coupling device using a cladding waveguide.

FIG. 2 is a top view of another embodiment of an edge coupling device 200 using a cladding 210. In FIG. 2, edge coupling device 200 uses a cladding between thin slab waveguide 206 and low-index waveguide 208. Edge coupling device 200 is configured to communicate light 270 and to transfer an optical mode of the light 270 among a thick waveguide 204, a thin slab waveguide 206, and a low-index waveguide 208. Edge coupling device 200 is configured such that an optical mode of a light 270 may be transferred in a first direction 280 from thick waveguide 204 to thin slab waveguide 206 and from thin slab waveguide 206 to low-index waveguide 208 across a cladding 210. Transferring an optical mode in the first direction 280 converts the optical mode to a larger optical mode. Alternatively, the optical mode of light 270 can be transferred in a second direction 282 from the low-index waveguide 208 to thin slab waveguide 206 across the cladding 210 and from thin slab waveguide 206 to thick waveguide 204. Transferring an optical mode in the second direction 282 converts the optical mode to a smaller optical mode.

Thick waveguide 204, thin slab waveguide 206, cladding 210, and low-index waveguide 208 are disposed on a substrate 202. Substrate 202 may be configured similarly to substrate 102 in FIG. 1. Edge coupling device 200 is configured such that an adiabatically tapered portion of thick waveguide 204 and an adiabatically tapered portion of thin slab waveguide 206 are substantially parallel and a gap 258 between thick waveguide 204 and thin slab waveguide 206 is substantially constant. Gap 258 may be configured similarly to gap 158 in FIG. 1. Edge coupling device 200 may be configured as shown or in any other suitable configuration as would be appreciated by one of ordinary skill in the art upon viewing this disclosure.

Thick waveguide 204 is configured similarly to thick waveguide 104 in FIG. 1. Thick waveguide 204 is adiabatically tapered from a first location 204A to a second location 204B such that first location 204A is wider than second location 204B. First location 204A is any suitable width and may vary depending on the material of the thick waveguide 204. In an embodiment, second location 204B is as narrow as fabrication processes allow. Alternatively, second location 204B is any suitable width. Thick waveguide 204 may be configured as shown or with any other suitable orientation, tapering, length, width, and/or thickness.

Thin slab waveguide 206 is configured similarly to thin slab waveguide 106 in FIG. 1. Thin slab waveguide 206 is configured such that at least a portion 260 of thin slab waveguide 206 is in parallel with thick waveguide 204. Thin slab waveguide 206 has a first adiabatic tapering from a first location 206A to a second location 206B such that second location 206B is wider than first location 206A and has a second adiabatic tapering from second location 206B to a third location 206C such that second location 206B is wider than third location 206C. In an embodiment, first location 206A and/or third location 206C are as narrow as fabrication processes allow. In another embodiment, first location 206A and/or third location 206C are any suitable width. Second location 206B is any suitable width and may vary depending on the material of thin slab waveguide 206. Thin slab waveguide 206 may be configured as shown or with any other suitable orientation, tapering, length, width, and/or thickness. The amount of optical mode from light 270 that transfers between thick waveguide 204 and thin slab waveguide 206 is proportional to the ratio of the cross-sectional area of thick waveguide 204 and the cross-sectional area of thin slab waveguide 206 at a given location, for example, at cross-sections 250-256.

At least a portion 262 of the adiabatically tapering of thin slab waveguide 206 is disposed within cladding 210 and low-index waveguide 108. Low-index waveguide 208 is configured similarly to low-index waveguide 108 in FIG. 1. Low-index waveguide 208 is separated from thin slab waveguide 206 by cladding 210, which forms a gap 264. In an embodiment, gap 264 may be configured similarly to gap 158 in FIG. 1. The amount of optical mode from light 270 that transfers between thin slab waveguide 206 and low-index waveguide 208 is proportional to the ratio of the cross-sectional area of thin slab waveguide 206 and the cross-sectional area of low-index waveguide 208 at a given location, for example, at third location 206C of thin slab waveguide 206.

Figure 3:
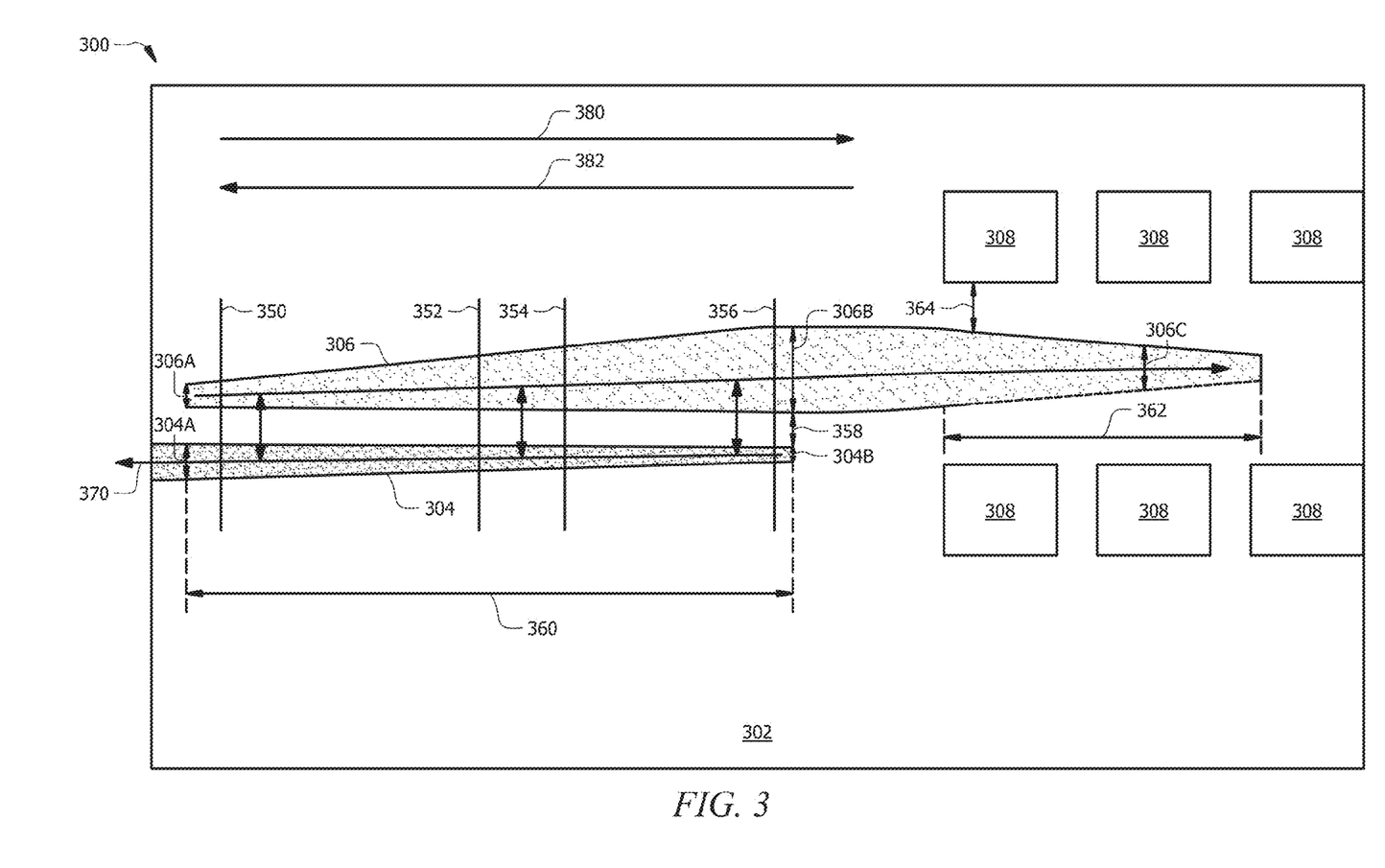
FIG. 3 is a top view of another embodiment of an edge coupling device using suspended edge coupling.

FIG. 3 is a top view of another embodiment of an edge coupling device 300 using suspended edge coupling. In FIG. 3, edge coupling devices uses suspended edge coupling between thin slab waveguide 306 and low-index core 302. Edge coupling device 300 is configured to communicate light 370 and to transfer an optical mode of the light 370 among a thick waveguide 304, a thin slab waveguide 306, and a low-index core 302. Edge coupling device 300 is configured such that an optical mode of a light 370 may be transferred in a first direction 380 from thick waveguide 304 to thin slab waveguide 306 and from thin slab waveguide 306 to low-index core 302 across an air cladding 308. Transferring an optical mode in the first direction 380 converts the optical mode to a larger optical mode. Alternatively, the optical mode of light 370 can be transferred in a second direction 382 from the low-index core 302 to thin slab waveguide 306 across the air cladding 308 and from thin slab waveguide 306 to thick waveguide 304. Transferring an optical mode in the second direction 382 converts the optical mode to a smaller optical mode.

Thick waveguide 304 and thin slab waveguide 306 are disposed on low-index core 302. Low-index core 302 is a low-index waveguide and has a lower refractive index than thick waveguide 304 and thin slab waveguide 306. Low-index core 302 is formed of materials including, but not limited to, silicon oxide, silicon oxide nitride, silicon carbide, and aluminum oxide. Edge coupling device 300 is configured such that an adiabatically tapered portion of thick waveguide 304 and an adiabatically tapered portion of thin slab waveguide 306 are substantially parallel and a gap 358 between thick waveguide 304 and thin slab waveguide 306 is substantially constant. Gap 358 may be configured similarly to gap 158 in FIG. 1. Edge coupling device 300 may be configured as shown or in any other suitable configuration as would be appreciated by one of ordinary skill in the art upon viewing this disclosure.

Thick waveguide 304 is configured similarly to thick waveguide 104 in FIG. 1. Thick waveguide 304 is adiabatically tapered from a first location 304A to a second location 304B such that first location 304A is wider than second location 304B. First location 304A is any suitable width and may vary depending on the material of thick waveguide 304. In an embodiment, second location 304B is as narrow as fabrication processes allow. Alternatively, second location 304B is any suitable width. Thick waveguide 304 may be configured as shown or with any other suitable orientation, tapering, length, width, and/or thickness.

Thin slab waveguide 306 is configured similarly to thin slab waveguide 106 in FIG. 1. Thin slab waveguide 306 is configured such that at least a portion 360 of thin slab waveguide 306 is in parallel with thick waveguide 304. Thin slab waveguide 306 has a first adiabatic tapering from a first location 306A to a second location 306B such that second location 306B is wider than first location 306A and has a second adiabatic tapering from second location 306B to a third location 306C such that second location 306B is wider than third location 306C. In an embodiment, first location 306A and/or third location 306C are as narrow as fabrication processes allow. In another embodiment, first location 306A and/or third location 306C are any suitable width. Second location 306B is any suitable width and may vary depending on the material of the thin slab waveguide 306. Thin slab waveguide 306 may be configured as shown or with any other suitable orientation, tapering, length, width, and/or thickness. The amount of optical mode from light 370 that transfers between the thick waveguide 304 and the thin slab waveguide 306 is proportional to the ratio of the cross-sectional area of thick waveguide 304 and the cross-sectional area of thin slab waveguide 306 at a given location, for example, at cross-sections 350-356.

At least a portion 362 of the adiabatically tapering of thin slab waveguide 306 is separated from the air cladding 308 by a gap 364. In an embodiment, gap 364 may be configured similarly to gap 158 in FIG. 1. Further, the gap 364 can be filled by silicon dioxide (SiO2) or any other suitable material as would be appreciated by one of ordinary skill in the art upon viewing this disclosure. The amount of optical mode from light 370 that transfers between thin slab waveguide 306 and low-index core 302 is proportional to the ratio of the cross-sectional area of thin slab waveguide 306 and the cross-sectional area of low-index core 302 at a given location, for example, at third location 306C of thin slab waveguide 306.

Figure 4:
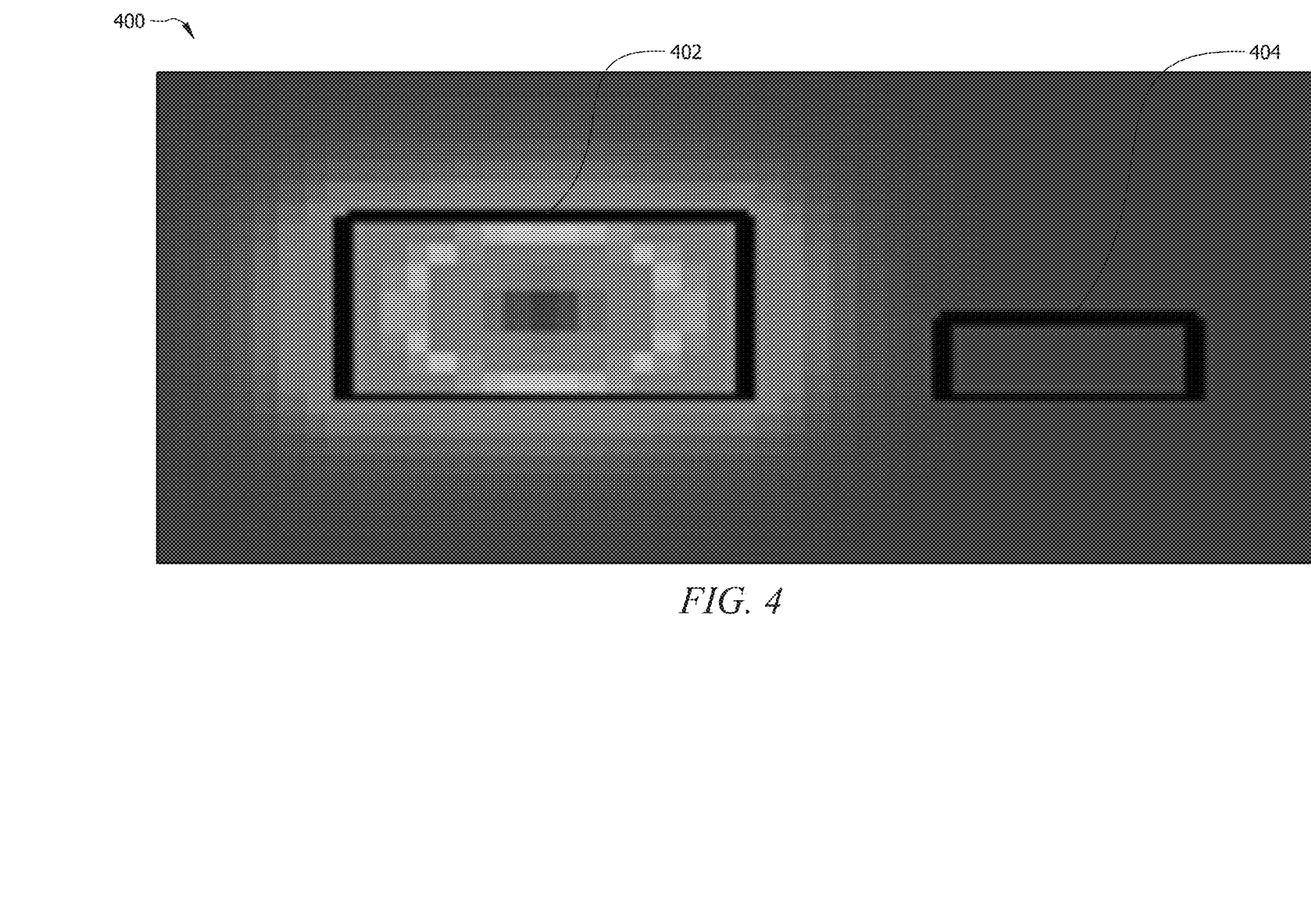
FIG. 4 is an energy density graph of an embodiment of a cross section for a thick waveguide and a thin slab waveguide at a first location of an edge coupling device.

FIG. 4 is an energy density graph of an embodiment of a cross section 400 of a thick waveguide 402 and a thin slab waveguide 404 at a first location of an edge coupling device. For example, cross section 400 corresponds with cross section 150 of thick waveguide 104 and thin slab waveguide 106 in FIG. 1. The cross-sectional area of thick waveguide 402 is substantially greater than the cross-sectional area of thin slab waveguide 404. Cross section 400 illustrates a mode energy density and a mode profile for thick waveguide 402 and thin slab waveguide 404. Cross section 400 shows that a substantial portion (e.g., over 95%) of the mode energy for an optical mode is in thick waveguide 402 and almost none of the mode energy for the optical mode is in thin slab waveguide 404.

Figure 5:
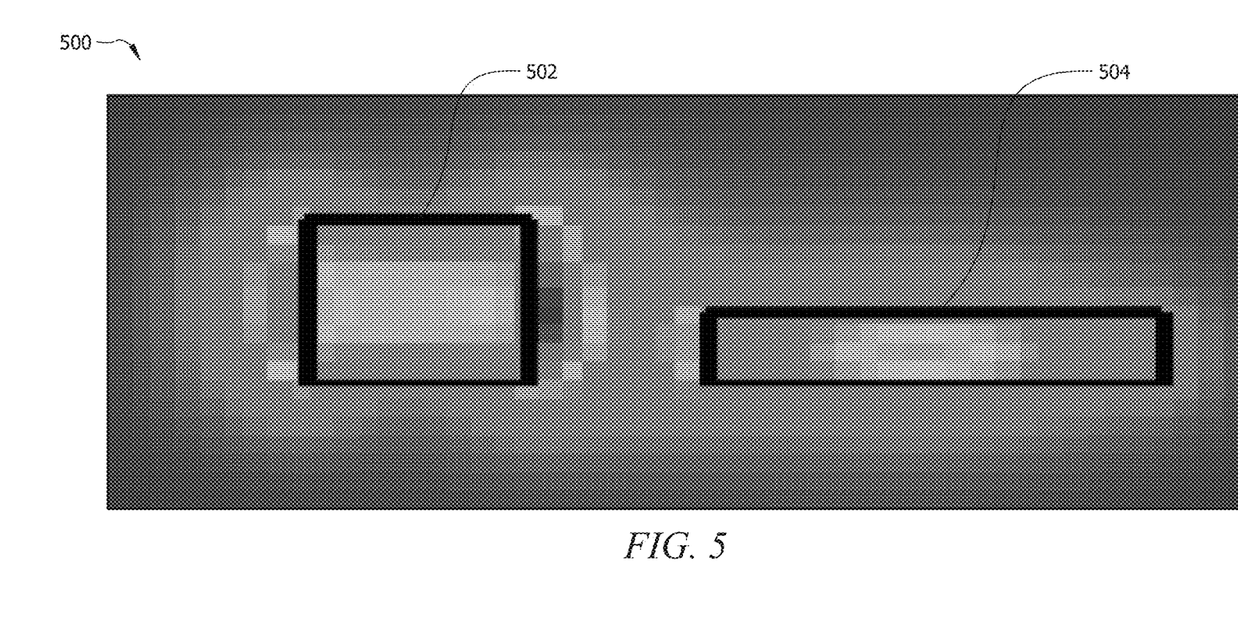
FIG. 5 is an energy density graph of an embodiment of a cross section for a thick waveguide and a thin slab waveguide at a second location of an edge coupling device.

FIG. 5 is an energy density graph of an embodiment of a cross section 500 for a thick waveguide 502 and a thin slab waveguide 504 at a second location of an edge coupling device. For example, cross section 500 corresponds with cross section 152 of thick waveguide 104 and thin slab waveguide 106 in FIG. 1. The cross-sectional area of thick waveguide 502 is comparable (e.g., about the same) as the cross-sectional area of thin slab waveguide 504. Cross section 500 illustrates a mode energy density and a mode profile for the thick waveguide 502 and the thin slab waveguide 504. Cross section 500 shows about an equal amount of the mode energy for an optical mode is in thick waveguide 502 and in thin slab waveguide 504.

Figure 6:
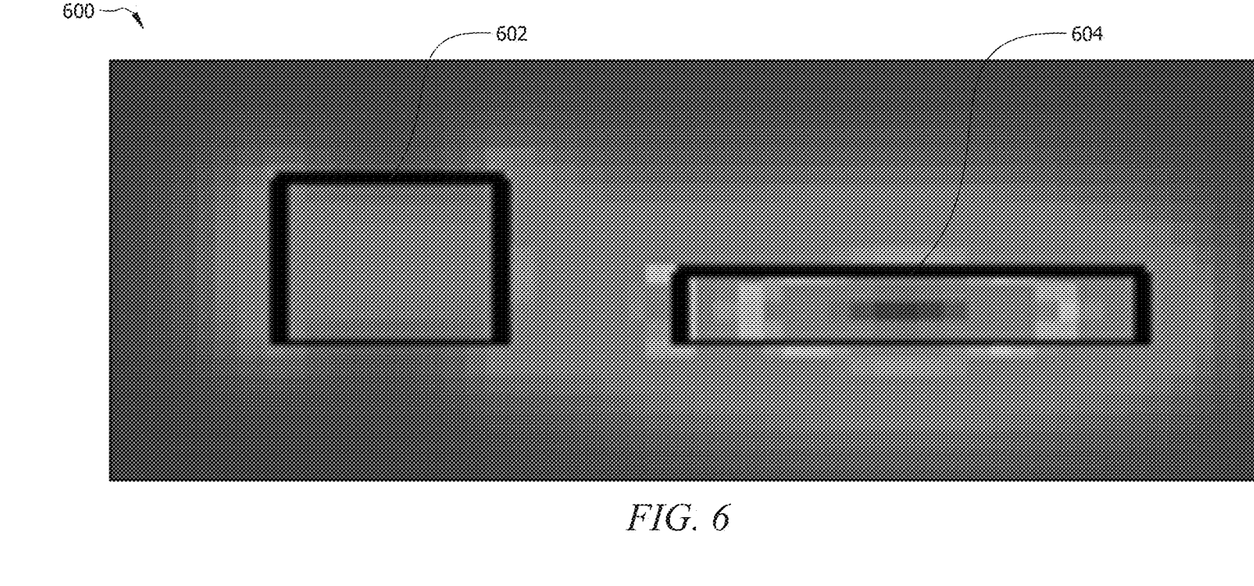
FIG. 6 is an energy density graph of an embodiment of a cross section for a thick waveguide and a thin slab waveguide at a third location of an edge coupling device.

FIG. 6 is an energy density graph of an embodiment of a cross section 600 for a thick waveguide 602 and a thin slab waveguide 604 at a third location of an edge coupling device. For example, cross section 600 corresponds with cross section 154 of thick waveguide 104 and thin slab waveguide 106 in FIG. 1. The cross-sectional area of thick waveguide 602 is less than the cross-sectional area of thin slab waveguide 604. Cross section 600 illustrates a mode energy density and a mode profile for the thick waveguide 602 and the thin slab waveguide 604. Cross section 600 shows that a majority of the mode energy for an optical mode is in thin slab waveguide 604.

Figure 7:
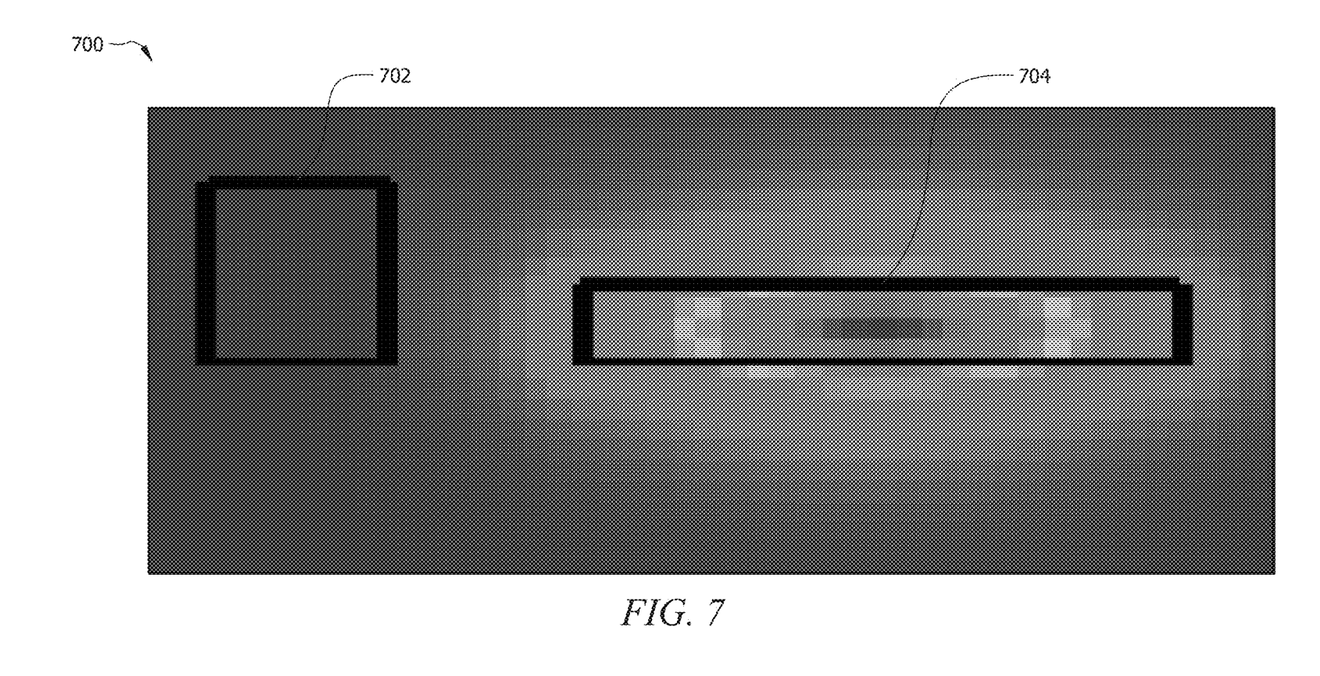
FIG. 7 is an energy density graph of an embodiment of a cross section for a thick waveguide and a thin slab waveguide at a fourth location of an edge coupling device.

FIG. 7 is an energy density graph of an embodiment of a cross section 700 for a thick waveguide 702 and a thin slab waveguide 704 at a fourth location of an edge coupling device. For example, cross section 700 corresponds with cross section 156 of thick waveguide 104 and thin slab waveguide 106 in FIG. 1. The cross-sectional area of thick waveguide 702 is substantially less than the cross-sectional area of thin slab waveguide 704. Cross section 700 illustrates a mode energy density and a mode profile for thick waveguide 702 and thin slab waveguide 704. Cross section 700 shows that almost none of the mode energy for the optical mode is in thick waveguide 702 and a substantial portion (e.g., over 95%) of the mode energy for an optical mode is in thin slab waveguide 704.

Figure 8:
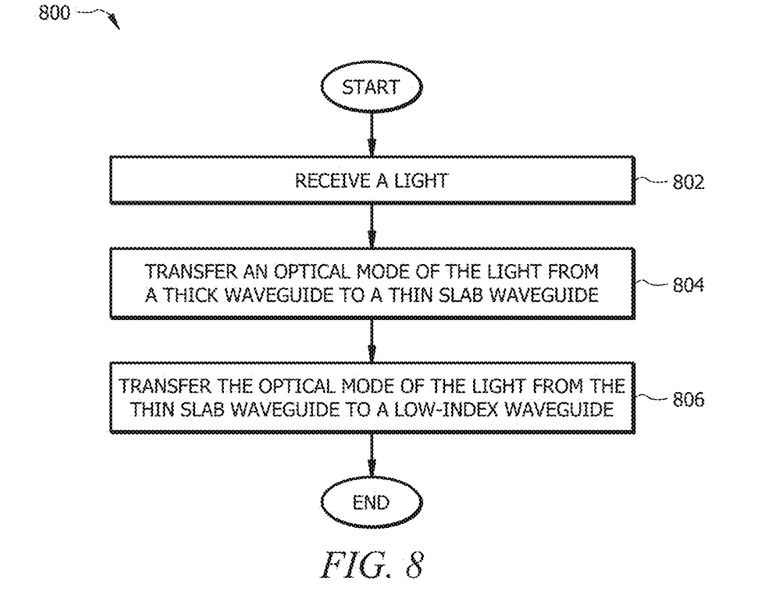
FIG. 8 is a flowchart of an embodiment of an optical mode transfer method.

FIG. 8 is a flowchart of an embodiment of an optical mode transfer method 800 using an edge coupling device. The edge coupling device is configured to communicate light and to transfer an optical mode of the light in a first direction (e.g., direction 180 in FIG. 1) among a thick waveguide, a thin slab waveguide, and a low-index waveguide or core. As such, the edge coupling device is configured to convert the optical mode to a larger optical mode. An edge coupling device may be configured similarly to edge coupling device 100 in FIG. 1, edge coupling device 200 in FIG. 2, and edge coupling device 300 in FIG. 3. At step 802, the edge coupling device receives a light on an adiabatically tapered thick waveguide. The thick waveguide may be configured similarly to thick waveguide 104 in FIG. 1, thick waveguide 204 in FIG. 2, or thick waveguide 304 in FIG. 3. At step 804, the thick waveguide transfer an optical mode of the light to a thin slab waveguide using mode coupling between the adiabatic tapering on the thick waveguide and a first adiabatic tapering on the thin slab waveguide. A mode transfer occurs when about 92.5% to about 97.5% of the energy of an optical mode is transferred from a first waveguide (e.g., thick waveguide) to a second waveguide (e.g., thin slab waveguide). The thin slab waveguide may be configured similarly to thin slab waveguide 106 in FIG. 1, thin slab waveguide 206 in FIG. 2, or thin slab waveguide 306 in FIG. 3. At step 806, the thin slab waveguide transfers the optical mode of the light to a low-index waveguide using mode coupling between a second adiabatic tapering on the thin slab waveguide and the low-index waveguide. The low-index waveguide may be configured similarly to low-index waveguide 108 in FIG. 1, low-index waveguide 208 in FIG. 2, or low-index core 302 in FIG. 3.

Figure 9:
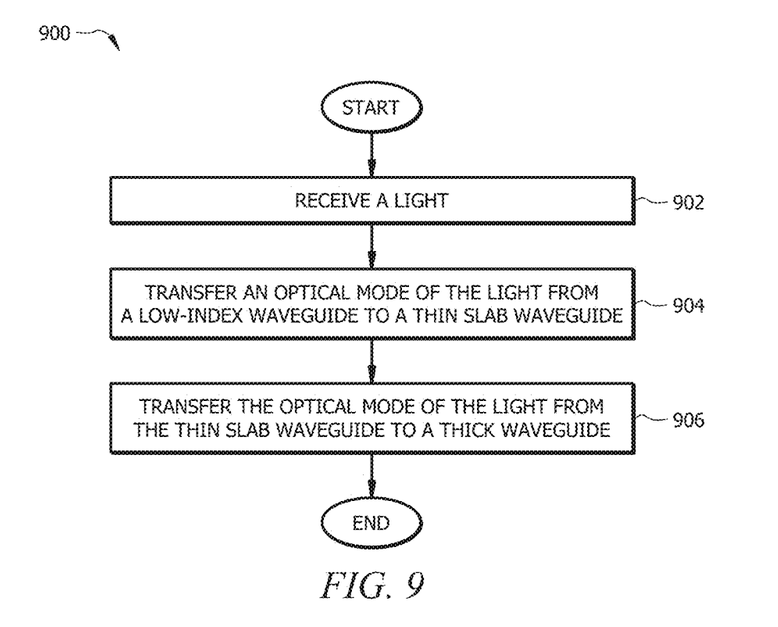
FIG. 9 is a flowchart of another embodiment of an optical mode transfer method.

FIG. 9 is a flowchart of another embodiment of an optical mode transfer method 900 using an edge coupling device. The edge coupling device is configured to communicate light and to transfer an optical mode of the light in a second direction (e.g., direction 182 in FIG. 1) among a thick waveguide, a thin slab waveguide, and a low-index waveguide or core. As such, the edge coupling device is configured to convert the optical mode to a smaller optical mode. An edge coupling device may be configured similarly to edge coupling device 100 in FIG. 1, edge coupling device 200 in FIG. 2, and edge coupling device 300 in FIG. 3. At step 902, the edge coupling device receives light at a low-index waveguide. The low-index waveguide may be configured similarly to low-index waveguide 108 in FIG. 1, low-index waveguide 208 in FIG. 2, or low-index core 302 in FIG. 3. At step 904, the low-index waveguide transfers an optical mode of the light to a thin slab waveguide using mode coupling between the low-index waveguide and a first adiabatically tapering on the thin slab waveguide. The thin slab waveguide may be configured similarly to thin slab waveguide 106 in FIG. 1, thin slab waveguide 206 in FIG. 2, or thin slab waveguide 306 in FIG. 3. At step 906, the thin slab waveguide transfers the optical mode of the light to a thick waveguide using mode coupling between a second adiabatic tapering on the thin slab waveguide and an adiabatic tapering on the thick waveguide. The thick waveguide may be configured similarly to thick waveguide 104 in FIG. 1, thick waveguide 204 in FIG. 2, or thick waveguide 304 in FIG. 3.

Figure 10:
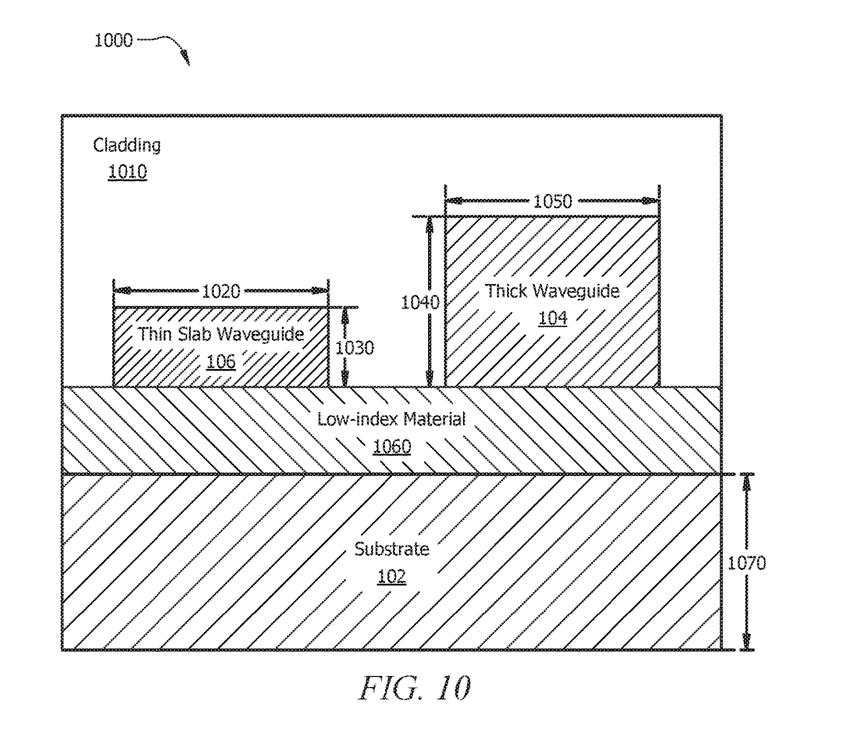
FIG. 10 is a cross-sectional view of the edge coupling device in FIG. 1.

FIG. 10 is a cross-sectional view 1000 of the edge coupling device 100 in FIG. 1. The cross-sectional view 1000 is taken along the cross-section 150 in FIG. 1. The cross-sectional view 1000 shows that the edge coupling device 100 comprises a cladding 1010, the thin slab waveguide 106, the thick waveguide 104, a low-index material 1060, and the substrate 102. The cross-sectional view 1000 further shows that the thin slab waveguide 106 comprises a width 1020 and a thickness 1030, the thick waveguide 104 comprises a width 1050 and a thickness 1040, and the substrate 102 comprises a thickness 1070. As can be seen, the width 1020 of the thin slab waveguide 106 and the width 1050 of the thick waveguide 104 are about the same. However, the thickness 1030 of the thin slab waveguide 106 is less than the thickness 1040 of the thick waveguide 104. As described above, the thickness 1030 of the thin slab waveguide 106 may vary from 5% to 80% of the thickness 1070 of the substrate 102. In other words, the thickness 1030 of the thin slab waveguide 106 may range from 6 nm to 800 nm. As also described above, the thickness 1040 of the thick waveguide 104 may be about equal to the thickness 1070 of the substrate 102. In other words, the thickness 1040 of the thick waveguide 104 may range from 120 nm to 1 μm. A second axis is parallel to the thickness 1030 and the thickness 1040. The components of the edge coupling device 200 in FIG. 2 and the components of the edge coupling device 300 in FIG. 3 may have similar features.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. An apparatus comprising:
   a thick waveguide comprising:
     a first adiabatic tapering from a first location to a second location, wherein the first adiabatic tapering is wider at the first location than at the second location; and
     a first thickness that tapers, is orthogonal to the first adiabatic tapering, and is between 120 nanometers (nm) and 1 micrometer (μm);

a thin slab waveguide comprising:
  a second adiabatic tapering from the first location to the second location, wherein the second adiabatic tapering is wider at the second location than at the first location;
  a third adiabatic tapering from the second location to a third location, wherein the third adiabatic tapering is wider at the second location than at the third location; and
  a second thickness that tapers and is orthogonal to the second adiabatic tapering and the third adiabatic tapering; and
a low-index waveguide at least partially adjacent to the third adiabatic tapering,
wherein the first thickness is greater than the second thickness,
wherein at least a portion of the first adiabatic tapering is adjacent to the second adiabatic tapering, and
wherein the first adiabatic tapering and the second adiabatic tapering are separated from each other by a constant gap.

2. The apparatus of claim 1, wherein the thick waveguide and the thin slab waveguide are high-index waveguides.

3. The apparatus of claim 1, wherein the gap is either between 50 nm and 199 nm or between 501 nm and 1 μm.

4. The apparatus of claim 1, wherein the thick waveguide and the thin slab waveguide are disposed on a silicon-on-insulator (SOI) substrate or an indium phosphide substrate.

5. The apparatus of claim 1, wherein the low-index waveguide comprises silicon, oxynitride $SiO_xN_y$), silicon-rich oxide ($SiO_x$), aluminum nitride (AlN), aluminum oxide ($Al_2O_3$), or silicon carbide (SiC).

6. The apparatus of claim 5, wherein the low-index waveguide at least partially covers the third adiabatic tapering.

7. The apparatus of claim 5, wherein the low-index waveguide is a suspended oxide waveguide.

8. The apparatus of claim 5, wherein the low-index waveguide is separated from the third adiabatic tapering by a cladding.

9. The apparatus of claim 8, wherein the cladding is air.

10. An optical mode converting method comprising:
receiving a light on a first waveguide comprising a first adiabatic tapering and a first thickness, wherein the first thickness tapers, is orthogonal to the first adiabatic tapering, and is between 120 nanometers (nm) and 1 micrometer (μm);
transferring an optical mode of the light from the first adiabatic tapering on the first waveguide to a second adiabatic tapering on a second waveguide using a first mode coupling, wherein the second waveguide comprises a second thickness that tapers and is orthogonal to the second adiabatic tapering, and wherein the first thickness is greater than the second thickness; and
transferring the optical mode from a third adiabatic tapering on the second waveguide to a third waveguide using a second mode coupling,
wherein the third waveguide is a low-index waveguide and is at least partially adjacent to the third adiabatic tapering.

11. The method of claim 10, wherein transferring the optical mode from the first adiabatic tapering to the second adiabatic tapering distributes an optical mode energy proportional to a first cross-sectional area of the first adiabatic tapering and a second cross-sectional area of the second adiabatic tapering.

12. The method of claim 10, wherein transferring the optical mode from the first adiabatic tapering to the second adiabatic tapering makes the optical mode larger.

13. The method of claim 10, wherein the first adiabatic tapering is wider at a first location than at a second location, and wherein the second adiabatic tapering is wider at the second location than at the first location.

14. The method of claim 10, wherein the first mode coupling from the first adiabatic tapering to the second adiabatic tapering is performed across a constant gap between the first adiabatic tapering and the second adiabatic tapering.

15. An apparatus comprising:
a first waveguide comprising a first adiabatic tapering and a first thickness, wherein the first thickness tapers, is orthogonal to the first adiabatic tapering, and is between 120 nanometers (nm) and 1 micrometer (μm);
a second waveguide comprising a second adiabatic tapering, a third adiabatic tapering, and a second thickness that tapers and is orthogonal to the second adiabatic tapering and the third adiabatic tapering; and
a third waveguide that is a low-index waveguide and is at least partially adjacent to the third adiabatic tapering,
wherein the first waveguide is configured to receive a light and mode couple to the second waveguide,
wherein the second waveguide is configured to mode couple to the third waveguide,
wherein the first thickness is greater than the second thickness,
wherein at least a portion of the first adiabatic tapering is adjacent to the second adiabatic tapering, and
wherein the first adiabatic tapering and the second adiabatic tapering are separated from each other by a constant gap.

16. The apparatus of claim 15, wherein mode coupling between the first adiabatic tapering and the second adiabatic tapering distributes an optical mode energy of the light proportional to a first cross-sectional area of the first adiabatic tapering and a second cross-sectional area of the second adiabatic tapering.

17. The apparatus of claim 15, wherein the first waveguide and the second waveguide are silicon.

18. The apparatus of claim 15, wherein the first waveguide and the second waveguide are indium phosphide.

19. The apparatus of claim 1, wherein a first width of the first adiabatic tapering is between about 400 nanometers (rim) and about 1 micrometer (μm) wide at the first location and between about 130 nm and about 180 nm at the second location.

20. The apparatus of claim 19, wherein a second width of the second adiabatic tapering is between about 130 nm and about 180 nm at the first location and between about 400 nm and about 1 μm at the second location.

21. The apparatus of claim 15, wherein the first waveguide is further configured to mode couple all of the light to the second waveguide at a first location, and wherein the second waveguide is further configured to mode couple all of the light to the third waveguide at a second location.

22. The apparatus of claim 1, wherein the first thickness and the second thickness are configured to provide a mode coupling between the thick waveguide and the thin slab waveguide.

23. The apparatus of claim 1, wherein the thick waveguide and the thin slab waveguide are positioned horizontally with respect to each other and with respect to a first axis that is parallel to the gap.

24. The apparatus of claim 23, wherein the thick waveguide and the thin slab waveguide are not positioned completely vertically with respect to each other and with respect to a second axis that is parallel to the first thickness and the second thickness.

25. The apparatus of claim 1, wherein the low-index waveguide does not consist of silicon (Si).

26. The apparatus of claim 15, wherein the second thickness is from 5% to 80% of the first thickness.

\* \* \* \* \*

UNITED STATES PATENT AND TRADEMARK OFFICE
CERTIFICATE OF CORRECTION

PATENT NO.        : 9,563,014 B2                                    Page 1 of 1
APPLICATION NO.   : 14/680175
DATED             : February 7, 2017
INVENTOR(S)       : Haupu Pan, Hongmin Chen and Xueyan Zheng It is certified that error appears in the above-identified patent and that said Letters Patent is hereby corrected as shown below:

In the Specification

Figure 11:
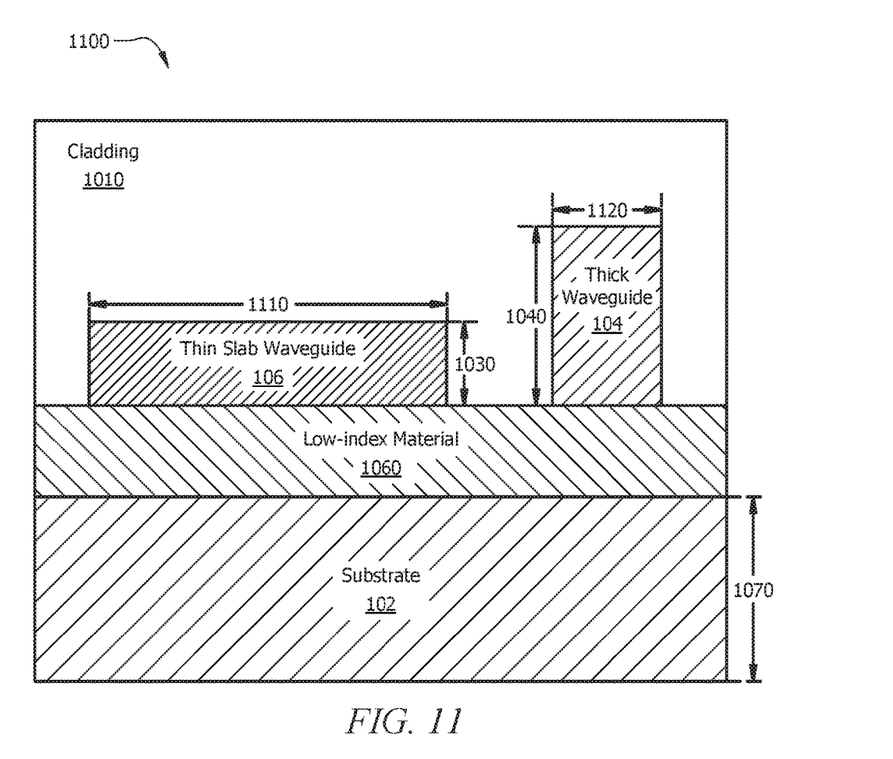
FIG. 11 is another cross-sectional view of the edge coupling device in FIG. 1.

Column 10, insert the following paragraph before Line 34:
--FIG. 11 is another cross-sectional view 1100 of the edge coupling device in FIG. 1. The cross-sectional view 1100 is taken along the cross-section 156 in FIG. 1. The cross-sectional view 1100 is similar to the cross-sectional view 1000 in FIG. 10. However, unlike the cross-sectional view 1000, the cross-sectional view 1100 shows that the thin slab waveguide 106 comprises a width 1110, the thick waveguide 104 comprises a width 1120, and the width 1110 of the thin slab waveguide 106 is wider than the width 1120 of the thick waveguide 104. This is due to the inverse tapering of the thin slab waveguide 106 and the tapering of the thick waveguide 104 from the cross-section 150 to the cross-section 156.--

In the Claims

Column 11, Lines 30-32, Claim 5 should read:
5. The apparatus of claim 1, wherein the low-index waveguide comprises silicon oxynitride (SiOxNy), silicon-rich oxide (SiOx), aluminum nitride (AlN), aluminum oxide (Al2O3), or silicon carbide (SiC).

Signed and Sealed this
Twenty-sixth Day of September, 2017

Joseph Matal
*Performing the Functions and Duties of the
Under Secretary of Commerce for Intellectual Property and
Director of the United States Patent and Trademark Office*